United States Patent [19]
Lantz et al.

[11] Patent Number: 6,035,293
[45] Date of Patent: Mar. 7, 2000

[54] VALIDATING PROCESS DATA IN MANUFACTURING PROCESS MANAGEMENT

[75] Inventors: Mikkel Lantz, Santa Clara; John Shea, Sunnyvale; Valerie Guinan, Cupertino; Richard Bartlett, Sunnyvale, all of Calif.

[73] Assignee: Advanced Micro Devices, Inc., Sunnyvale, Calif.

[21] Appl. No.: 08/954,220

[22] Filed: Oct. 20, 1997

[51] Int. Cl.[7] .................................................. G06F 17/30
[52] U.S. Cl. .......................... 707/1; 707/203; 364/468.01; 364/468.28; 364/469.01
[58] Field of Search .................. 707/1, 203; 364/468.28, 364/469.01

[56] References Cited

U.S. PATENT DOCUMENTS

| | | | |
|---|---|---|---|
| 4,571,685 | 2/1986 | Kamoshida | 364/468.15 |
| 5,495,417 | 2/1996 | Fuduka et al. | 364/468.28 |
| 5,694,325 | 12/1997 | Fukuda et al. | 364/468.28 |
| 5,716,856 | 2/1998 | Lin et al. | 148/DIG. 162 |
| 5,850,348 | 12/1998 | Berman | 364/488 |
| 5,859,964 | 1/1999 | Wang et al. | 395/185.01 |
| 5,863,807 | 1/1999 | Jang et al. | 438/14 |
| 5,887,187 | 3/1999 | Rostoker et al. | 712/29 |
| 5,892,256 | 4/1999 | Matsushita et al. | 257/301 |

*Primary Examiner*—Paul R. Lintz
*Assistant Examiner*—Ella Colbert

[57] ABSTRACT

An approach for managing a manufacturing process is provided. A specification and recipe management system (RSMS) manages the validation of new specifications that reference one or more recipes and one or more contexts stored in a recipe management system (RMS). The validation of new specifications includes verifying that RMS code blocks contained in the new specification can be processed by the RMS. Also, the versions of recipes and contexts referenced in the specification are checked to ensure that they are either the current, valid version number or a valid new version number. The RSMS provides a specification browser for examining cross-reference information for specifications, recipes and contexts. The cross-reference information specifies recipes and contexts referenced in a selected specification, subject to a recipe/context filter. In addition, the cross-reference information identifies specifications that reference a selected recipe or a selected context, subject to a specification filter. A project editor allows specifications, recipes and contexts to be grouped into projects for release. The versions of recipes and context referenced by the specifications contained in the project are compared to ensure that the same version of a recipe is referenced by all of the specifications in a project and that all specification referencing changing recipes or contexts are in the project.

29 Claims, 7 Drawing Sheets

300

\SECTION "80486BW"
\RMS-BEGIN
* Reference Specification : 07_9876(ASM/60,/80,/100)
*
*DEVISE LAYER STEPPER JOB   VALUES
*------------------------------------------------
R:80486 G:CS11-R05 E:"ASM/80"   N:80486BW Ver:1
              P:ENERGY  D:200 F:1 Type:P
              P:FOCUS   D:0    F:F Type:P
              P:LAYER   D:05   F:S Type:P
              P:RETICLE_1 D:08486BW05A1 F:F Type:P
Contect:Product Route Entity/80486/11PWM/"ASM/89"-
   Recipe:80486 Group:CS11-R05 Entity:"ASM/80"

\RMS-END

FIG. 3

VALIDATING PROCESS DATA IN MANUFACTURING PROCESS MANAGEMENT

FIELD OF THE INVENTION

The invention relates to the field of manufacturing products, more specifically to a method and apparatus for managing a manufacturing process for integrated circuits.

BACKGROUND OF THE INVENTION

The manufacture of products such as semiconductor devices often requires a number of discrete processing steps to produce a packaged semiconductor circuit device from raw semiconductor material. Specifically, the raw semiconductor material is usually a slice of single crystal silicon referred to as a wafer. Circuits of a particular type are fabricated together in batches of wafers called "lots" or "runs." The fabrication process creates regular arrays of a circuit on the wafers of a lot. During processing, the wafers in the lot may go through individual processing steps either one at a time or as a batch. At the completion of wafer processing, the wafers are tested to determine circuit functionality. Later, the wafers are sliced to separate the semiconductor devices which are then packaged individually.

In a typical semiconductor process, each of the wafer processing steps is performed by a processing station. A "recipe" is used to control a processing station during a particular processing step. In the context of semiconductor processing, a recipe is a set of process instructions that relates to both a particular process station and a particular processing step. For example, a recipe may specify various processing parameters such as temperature, pressure and gas flow, which are used during the set up and operation of a processing station. Since some semiconductor processes require many steps and run several processing stations in parallel for each processing step, and recipes are both machine-specific and process-step-specific, many recipes may be required to manufacture a semiconductor product. Consequently, recipes are typically stored on a database and then retrieved when a particular processing step is to be performed on a particular processing station.

To manage the processing of semiconductor devices, some semiconductor processes also use "specifications." A "specification" is a text file that specifies information about a particular process step. Specifications are usually "higher level" documents than recipes and often specify one or more recipes to be used during a particular processing step because of the importance of ensuring that a specification contains the correct information, specifications must satisfy several checks before they can be used.

A specification is first generated and examined for correct syntax and content. At this point the specification is "frozen" so that its contents cannot be changed. The frozen specification is then reviewed by process personnel and is considered to be "unapproved." Once the processing personnel approve the specifications, its status is changed to "approved."

Existing, previously approved specifications may also be updated or edited. Once an existing, approved specifications is changed, its syntax and content are again validated and the specification is frozen. Then the specification again enters sign-off and its status is changed to unapproved until the specification is approved by process personnel.

Consider the processing arrangement 100 illustrated in FIG. 1. Processing arrangement 100 includes a client 102, a recipe management system (RMS) 104 and a processing station 106. Client 102, RMS 104 and processing station 106 are communicatively coupled via communication bus 108.

RMS 104 includes a database 112 and a database server 114. Database 112 includes database system files and data files stored on a non-volatile storage medium, such as one or more disks. The data files include one or more recipes used with processing station 106 to perform processing steps on a wafer. Database server 114 writes data to and reads data from database 112 in a response to commands from client 102. For example, database server 114 provides recipes to processing station 106 in response to commands from client 102. Also, database server 114 updates recipes stored on database 112 in response to commands from client 102. Database 112 also stores context information that is used during wafer processing. Context information uniquely identifies each process step in the process, such as lot number, product, route and other similar information.

Processing station 106 includes an equipment interface 116 for providing communication between processing station 106 and communication bus 108. Processing station 106 also includes equipment 118 for performing a processing step on a wafer.

To perform a process step, processing station 106 requests a recipe from RMS 104. After receiving the recipe, processing station 106 performs the processing instructions specified in the recipe to complete the particular processing step.

Processing arrangement 100 includes a process manager 120 for tracking the overall processing of wafers. Process manager 120 is communicatively coupled to communication bus 108 and includes a database 122 and a database server 124. Database 122 includes database system files and process data files stored on a non-volatile storage medium, such as one or more disks. One type of file is the previously-described specification.

Database server 124 accesses data stored on database 122 in response to commands from client 102. Typically a process control operator examines the contents of a specification in use on process manager 120 via client 102 or directly on process manager 120 to determine which recipe is to be used to perform a processing step on a specific processing station. Then the operator separately communicates with RMS 104 to have the recipes that are referenced in the specification downloaded from RMS 104 to equipment interface 116 of processing station 106.

Although process manager 120 provides high level tracking of the work in progress on processing arrangement 100, process manager 120 in processing arrangement 100, process manager 120 also has its disadvantages. Specifically, the transactions between client 102 and the process manager 120 often are not coordinated with respect to recipes stored on RMS 104, which can cause inconsistencies in processing performed by processing arrangement 100. This is because RMS 104 and processing station 106 cannot process specifications. For example, database 122 may contain two specifications that each reference a particular recipe stored on database 112. A value in the recipe stored on database 112 may be updated to accommodate one of the specifications stored on database 122. However, the other specification may expect the recipe to contain the old value. Consequently, one specification on database 122 expects the recipe on database 112 to contain the updated value, while the second specification expects the recipe to contain the original value. As a result, client 102 may choose a particular specification from database 122 to be processed and obtain an unexpected result because of the change made to the recipe. A similar problem is that for some recipe management systems the context information does not have version capability. Consequently, only a single version of a particular context may be maintained on database 112.

One approach for resolving this problem is to establish a sign-off procedure wherein a version of a specification is manually certified by certain personnel who then manually verify that recipes on database 112 referenced by the specification on database 122 contain the correct information. However, because of the uncoordinated nature of transactions between process manager 120 and RMS 104, this approach often results in inconsistencies between what is expected to be contained in recipes stored on database 112 and what is actually contained in recipes stored on database 112.

Another solution is to have the specification sent directly from process manager 120 to process station 106 to be interpreted by equipment interface 116. Equipment interface 116 would then scan the specification for the recipe information to be used by equipment 118. However, not all recipe information has consistent syntax across different equipment, making this solution impractical.

In view of the need to manage manufacturing processes at a high level and the limitations in existing approaches, an alternative approach for managing specifications, recipes and contexts in semiconductor processes is highly desirable.

SUMMARY OF THE INVENTION

The need to manage specifications, recipes and contexts in semiconductor processing is met by embodiments of the invention described herein.

According to one aspect of the invention, an approach for managing a manufacturing process according to an embodiment of the invention includes a recipe and specification management system (RSMS), where the RSMS manages the validation of new specifications that reference one or more recipes and one or more contexts stored in a recipe management system (RMS). The validation of new specifications includes verifying that RMS code blocks contained in the new specification can be processed by the RMS. Also, the versions of recipes and contexts referenced in the specification are checked to ensure that they are either the current, valid version number or a valid new version number. The RSMS provides a specification browser for examining cross-reference information for specifications, recipes and contexts. The cross-reference information specifies recipes and contexts referenced in a selected specification, subject to a recipe/context filter. In addition, the cross-reference information identifies specifications that reference a selected recipe or a selected context, subject to a specification filter.

A project editor allows specifications, recipes and contexts to be grouped into projects for release. The versions of recipes and context referenced by the specifications contained in the project are compared to ensure that the same version of a recipe and version of a context is referenced by all of the specifications in a project.

One advantage provided by embodiments of the invention is that the approval of a specification guarantees that the contents of recipes and context referenced in the specification are the same as when the specification was frozen and approved. Thus, subsequent modifications of a recipe and/or a context do not interfere with an approved specification.

DESCRIPTION OF THE DRAWINGS

Embodiments of the invention are illustrated by way of example, and not by way of limitation, in the figures of the accompanying drawings and in which like reference numerals refer to similar elements and in which:

FIG. 3 is a diagram illustrating an RMS code block contained in a specification file according to an embodiment of the invention;

DESCRIPTION OF THE PREFERRED EMBODIMENT

An approach for managing a manufacturing process is described. In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

FUNCTIONAL OVERVIEW

A recipe and specification management system (RSMS) manages the use of specifications, recipes and contexts in a manufacturing process. The invention, the RSMS handles: 1) specification validity checks (scan and freeze); 2) specification sign-off; 3) specification browsing; and 4) project editing.

DETAILED DESCRIPTION

Figure 1:
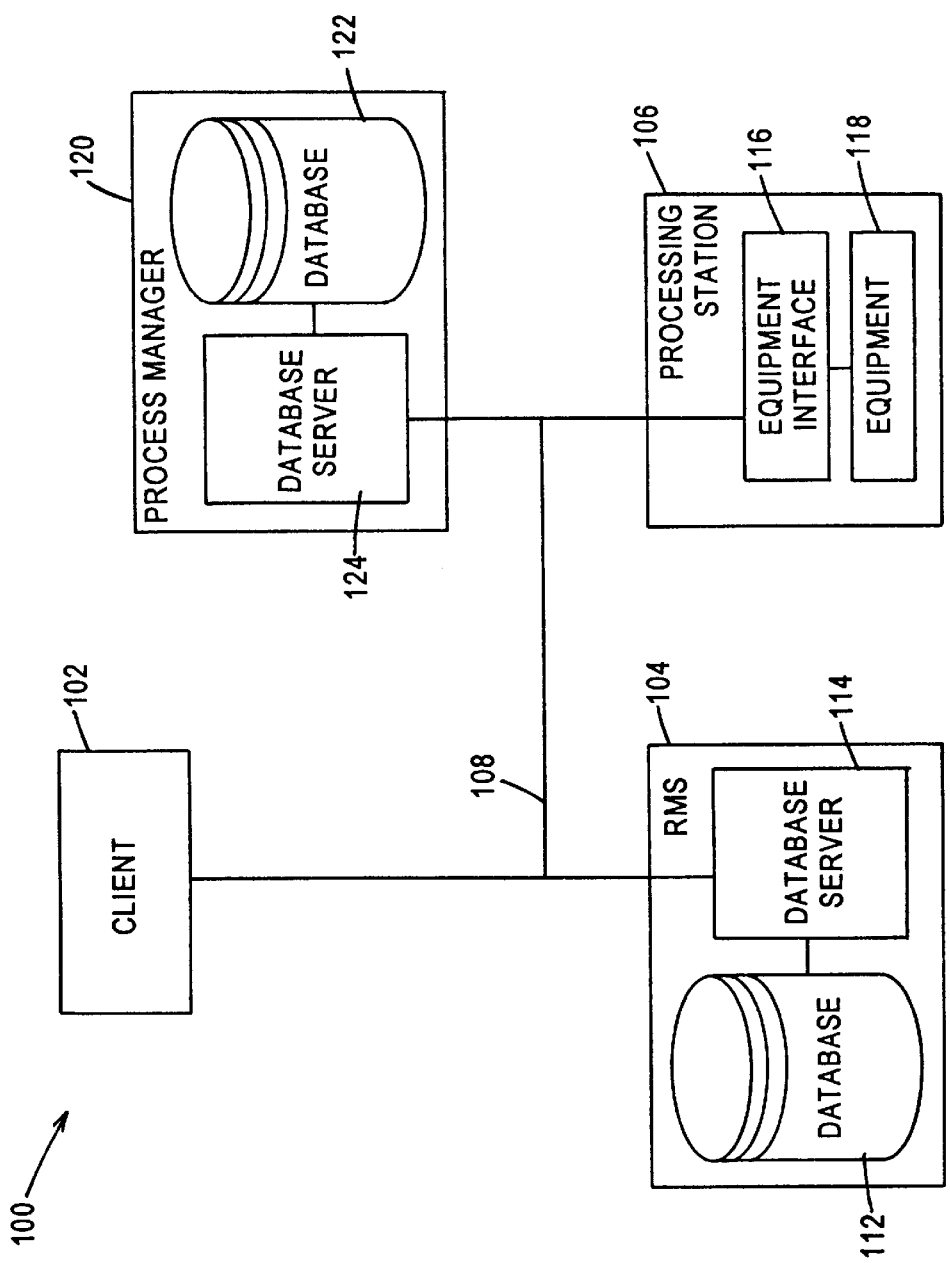
FIG. 1 is a block diagram that illustrates a conventional process management system.
Figure 2:
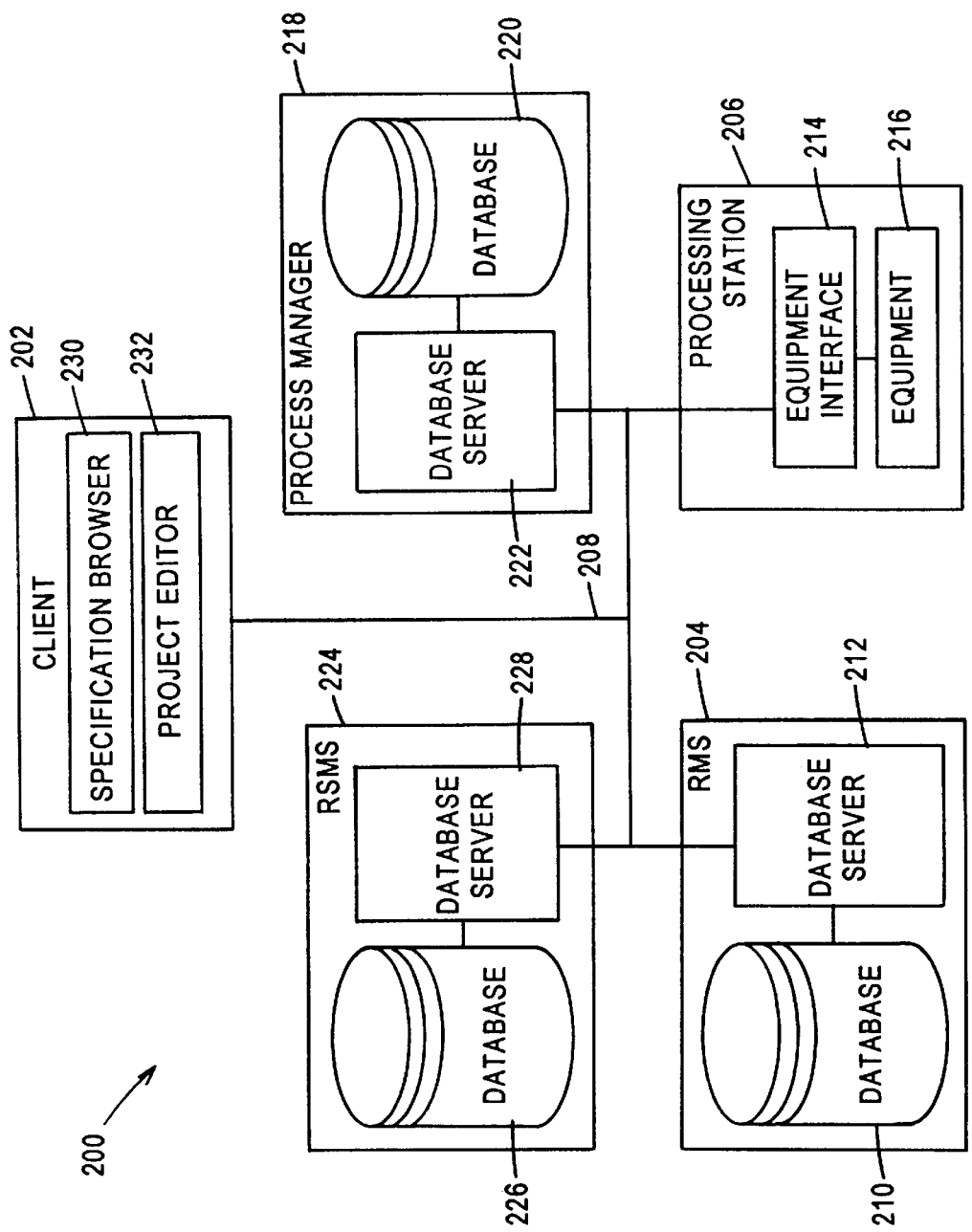
FIG. 2 is a block diagram that illustrates a process management system according to an embodiment of the invention.

FIG. 2 is a block diagram of a process management system 200 according to an embodiment of the present invention. The process management system 200 includes a client 202, a recipe management system (RMS) 204 and a processing station 206. Client 202, RMS 204 and processing station 206 communicate with each other via communication bus 208.

RMS 204 includes a database 210 and a database server 212. Database 210 includes database system files and data files stored on a non-volatile storage medium, such as one or more disks. The data files in the database 210 include one or more recipes used with processing station 206 to perform processing steps on a semiconductor wafer. Database 210 also stores context information which uniquely identifies each process step in the process, such as lot number, product, route and other similar information. An example of a recipe management system is RMS, a product of Consilium of Mountain View, Calif.

Processing station 206 includes an equipment interface 214 for providing communication between equipment 216 and communication bus 208. Processing station 206 also includes equipment 216 for performing a processing step on a semiconductor wafer. For purposes of explanation, process management system 200 is described and illustrated in the context of a single processing station 206. However, the invention is applicable to manufacturing processes using any number of processing stations.

Process management system 200 includes a process manager 218 for tracking the work in progress for a manufacturing process. Process manager 218 includes a database 220 and a database server 222. Database 220 includes database system files and process data files stored on a non-volatile storage medium, such as one or more disks. One type of process data file is a specification. An example of a process manager is Workstream, a product of Consilium of Mountain View, Calif. Workstream is a database application used to control information flow in a manufacturing process.

Process management system 200 also includes a recipe and specification management system (RSMS) 224 for processing process data as described herein. RSMS 224 includes a database 226 and a database server 228. Database 226 includes database system files and data files stored on a non-volatile storage medium, such as one or more disks. RSMS 224 coordinates the use of specifications, recipes and contexts on process management system 200, as described in more detail below.

Client 202 is one or more processes that interact with RMS 204 to create and edit recipes and with process manager 218 to create and edit specifications.

1) Specification Validity Checks (Scan and Freeze) One important function provided by RSMS 224 is the validity checking of new unapproved specifications. New specifications are generated and then submitted to process manager 218 by client 202 via communication bus 208. New specifications may also be generated directly on process manager 218. Process manager 218 transmits the new, unapproved specifications to RSMS 224 to have a validity check performed. The validity check includes both a syntax check and a version check. To perform these checks, RSMS 224 examines or scans a new specification to identify any RMS code blocks contained in the specification. Any RMS code blocks are extracted from the specification and checked by RSMS 224 using RMS 204. The syntax check ensures that RMS code blocks contained in the specification are in proper RMS format and can be processed by RMS 204. FIG. 3 illustrates an example of an RMS code block 300.

The validity check also ensures that version numbers of recipes and context referenced in a specification are consistent with the current, valid version numbers of the referenced recipes stored in RMS 204 and the current, valid version numbers of referenced context which are maintained on RSMS 224. Specifically, a reference to an existing recipe must specify the most recent version of that particular recipe. However, if a new version of a recipe is referenced in a specification, i.e. the version does not match any versions of that recipe stored in RMS 204, then the reference must specify the next available valid version number, without skipping version numbers. The same check is performed for context referenced in the RMS code block except that the current version number is stored on RSMS 224.

The version validation also verifies parameter information in the RMS code block as well as links to other recipes specified in the RMS code block. If the specification is successfully validated, then RSMS 224 notifies process manager 218 and the new specification is frozen. Process manager 218 maintains status information for all specifications which is available to RSMS 224.

Figure 4:
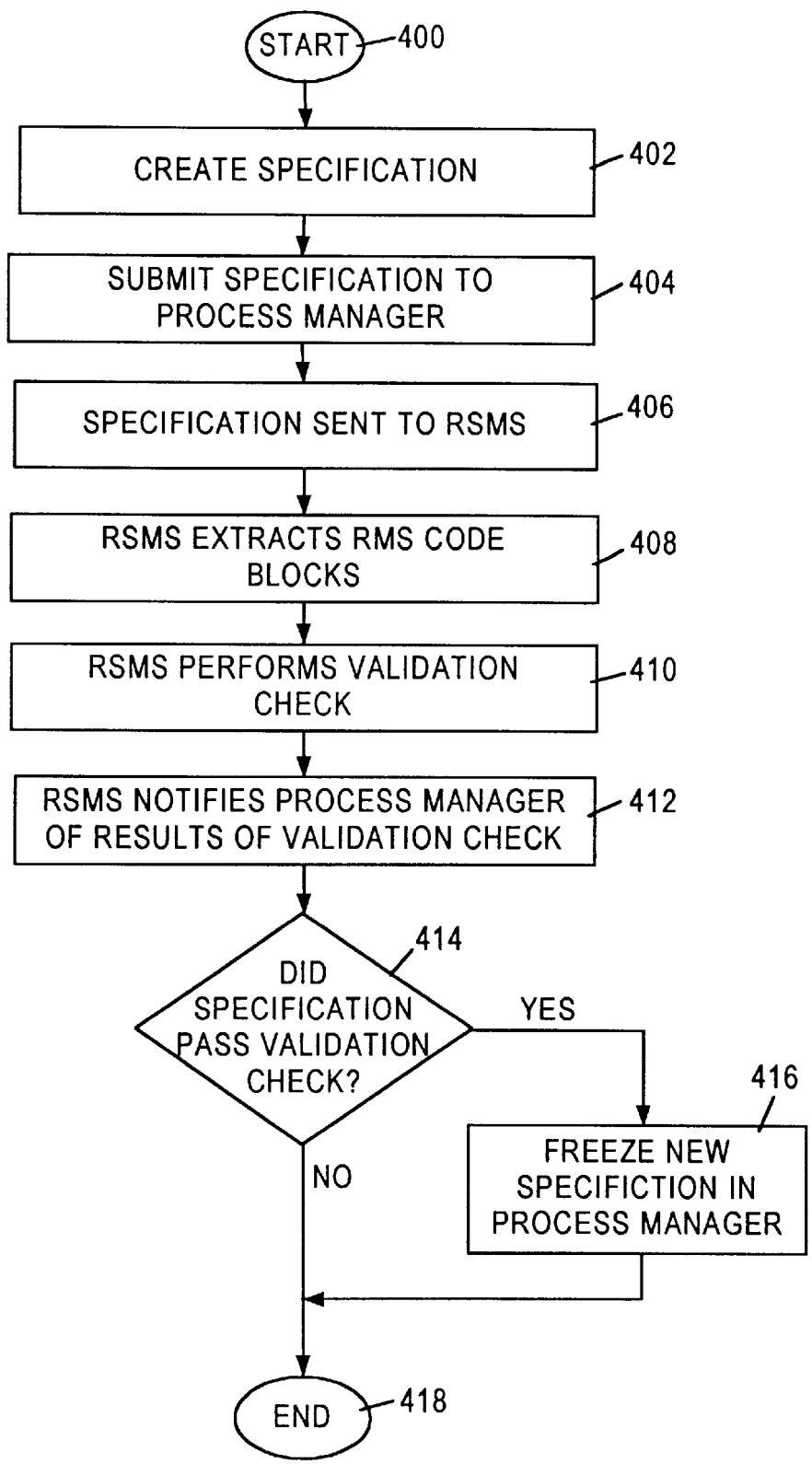
FIG. 4 is a flow chart that illustrates the process for validating a specification file according to an embodiment of the invention.

The process for validating a new specification is now described with reference to the flow chart of FIG. 4. After initialization in step 400, in step 402 a new specification is created either on process manager 218 or elsewhere, such as on client 202. In step 404 the new specification is submitted to process manager 218. Then, in step 406 the new specification is sent to RSMS 224. In step 408, RSMS 224 extracts RMS code blocks from the specification and in step 410 the RSMS 224 performs a validation check using RMS 204. Then in step 412, RSMS 224 notifies process manager 218 of the results of the validation check. In step 414 a determination is made as to whether the specification passed the validation check. If so, then in step 416 the status of the new specification on process manager 218 is updated to reflect the successful validation check and to freeze the specification. The process is then complete in step 418. Once a specification has been successfully validated, then the specification is frozen so that no further changes can be made to the specification.

2) Specification Sign-off

Once a new specification has been validated and frozen, the specification must be approved and "signed off." One or more users notify process manager 218 that they agree to have the new, frozen specification signed off. After the last user has notified process manager 218, process manager 218 signals RSMS 224 that the new, frozen specification is ready for sign-off. RSMS 224 then causes the status of the new, frozen specification to be changed from "frozen" to "in sign-off."

Specifications with a status of "in sign-off" are eligible to be released, as described hereinafter in more detail in the description of the project editor.

3) Specification Browser

As illustrated in FIG. 2, client application 202 includes a specification browser 230 that displays cross referencing information between specifications, recipes and contexts. Specially, specification browser 230 identifies recipes and contexts referenced in a selected specification, subject to a recipe/context filter. In addition, specification browser 230 identifies specifications that reference a selected recipe or a selected context, subject to a specification filter.

Figure 5:
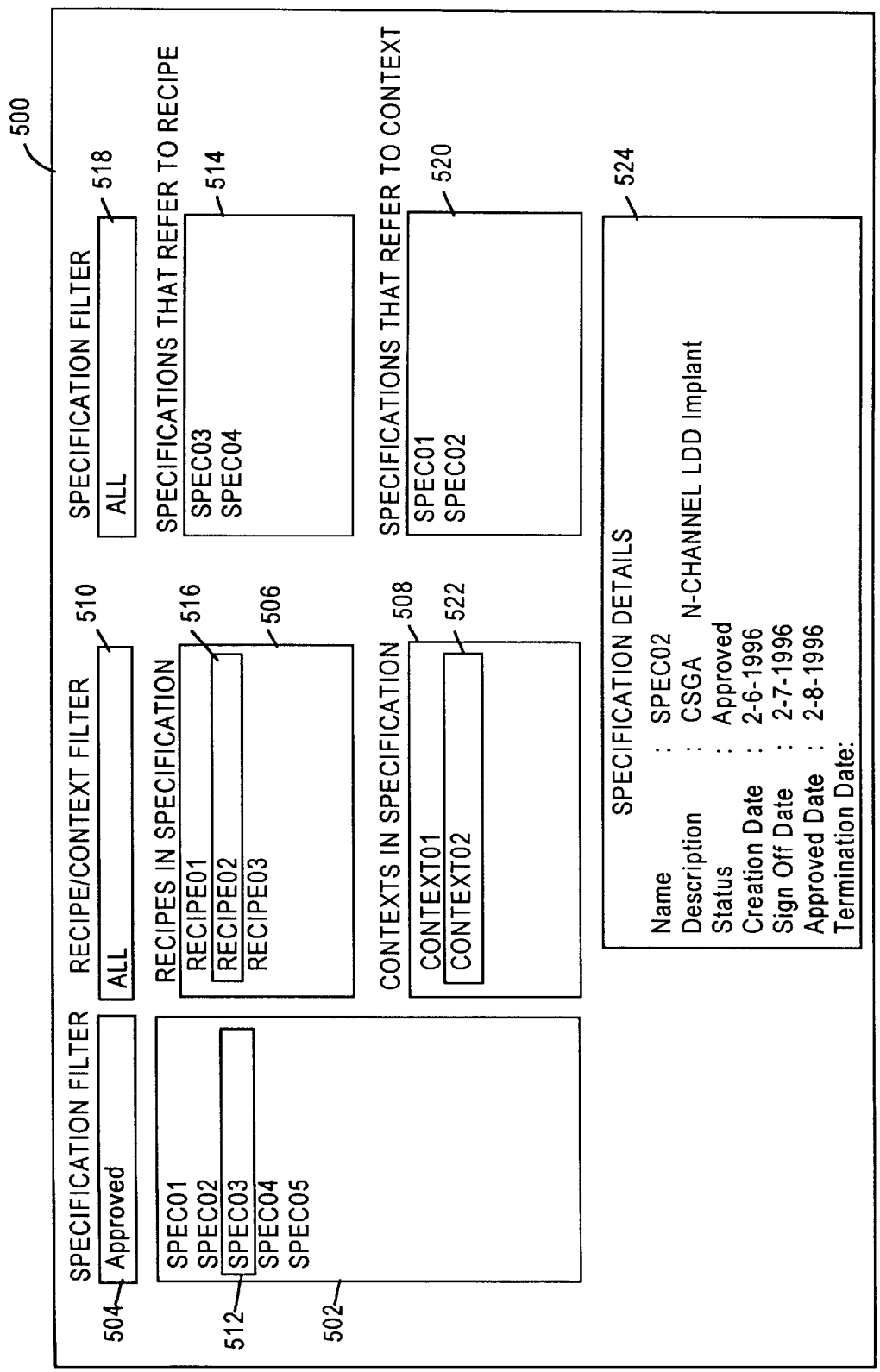
FIG. 5 is a diagram illustrating a user interface associated with the specification browser according to an embodiment of the invention.

FIG. 5 illustrates a user interface 500 of specification browser 230. User interface 500 includes a display 502 of specifications stored on database 220 of process manager 218. However, the specifications may also be stored on RMS 204, RSMS 224, client 202 or processing station 206. A specification filter 504 provides the capability to control which specifications are displayed in display 502 based upon specification status. For example, specification filter 504 allows a user to select all specifications, specifications that have been frozen, specifications in sign-off or specifications that have been approved.

User interface 500 also includes a display 506 for displaying the recipes that are referenced in a particular specification selected from display 502. Similarly, display 508 displays context files that are referenced in the particular specification selected from display 502. The recipes displayed in display 506 and the context information displayed in display 508 are based upon both the selected specification in display 502 and a recipe/context filter 510. Recipe/context filter 510 provides the capability to control which recipes and context referenced in the selected specification are displayed in displays 506 and 508 based upon the status of the recipes and context. For example, in display 502, a specification identified as SPEC03 has been selected as indicated by a selector 512. As indicated by display 506, specification SPEC03 contains references to three recipes identified as RECIPE01, RECIPE02 and RECIPE03. Also, as indicated by display 508, specification SPEC03 also contains a reference to contexts identified as CONTEXT01 and CONTEXT02.

User interface 500 also identifies specifications that reference a selected recipe or a selected context, subject to a specification filter. As illustrated by a display 514, a selected recipe, identified as RECIPE02, as selected by selector 516, is referenced in specifications SPEC03 and SPEC04. A specification filter 518 is used to specify which specifications are to be checked, and allows the user to select all approved specifications, specifications that have been frozen, specifications in sign-off, or specifications that have been approved.

User interface 500 also displays specifications that contain a selected context. For example, a display 520 indicates that context CONTEXT02, as selected by selector 522 in display 508, is referenced by specifications identified as SPEC01 and SPEC03. User interface 500 also provides detailed information about a selected specification. As illustrated by display 524, the specification details include the specification name, description, status, creation date, sign-off date, approved date and termination date. However, other details, in addition to, or in place of the details listed may also be provided.

4) Project Editor

A project editor 232 (FIG. 2) provides a mechanism for grouping specifications, recipes and contexts into "projects" for release. A project is a logical construct that represents a series of process steps to be performed to achieve a particular result. Project editor 232 allows a user to specify one or more specifications to be included in a project to perform the steps required by the project and then performs several verifications. Specifically, project editor 232 verifies that references in more than one specification to the same recipe specify the same version of that recipe. Similarly, project editor 232 verifies that references in more than one specification to the same context specify the same version of that context. Project editor 232 also ensures that no specifications referencing the previous version of the recipes or contexts are missing from the project. Once project editor 232 performs these verifications and confirms that there are no errors, then the project is approved and released. Then, RSMS 224 instructs RMS 204 to establish the recipe versions referenced in the specification as the current, valid version. RSMS 224 also establishes the versions of context referenced in the specification as the current, valid version. Once a project has been released, the status for that project is updated to reflect that the project has been approved and released. Projects are stored on database 220 of process manager 218 or in other locations, such as RMS 204, RSMS 224, client 202, or processing station 206.

Figure 6:
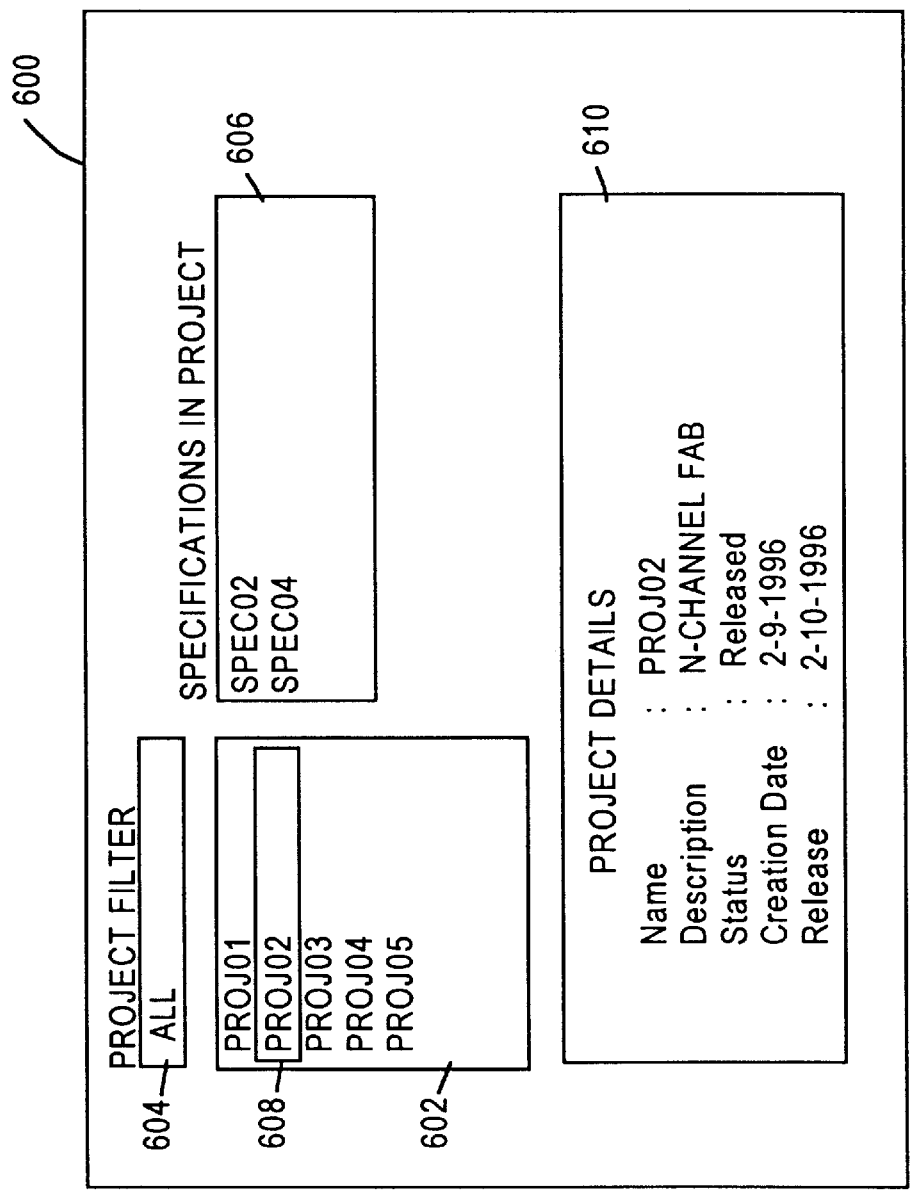
FIG. 6 is a diagram illustrating a user interface associated with the project editor according to an embodiment of the invention.

FIG. 6 illustrates a user interface 600 of project editor 232. A display 602 identifies the existing projects, based upon a filter selection specified by project filter 604. A user may change the filter selection of project filter 604 so that all projects are displayed or instead, only those projects that have been released.

A display 606 identifies the specifications included in a selected project. A selector 608 is used to select a particular project from the projects listed in display 602. As illustrated in FIG. 6, a project identified as PROJ02 is selected with selector 608. Display 606 lists two specifications identified as SPEC02 and SPEC04 that are included in project PROJ02.

User interface 600 also includes a display 610 that displays project details about a selected project. As illustrated by display 610, the project details include the project name, description, status, creation date and release date. However, other details, in addition to, or in place of the details listed may also be provided. Once a project has been approved, a user processes the project on process manager 218.

Although embodiments of the invention have been described and illustrated in the drawings in the context of the RSMS 224 being separate from client 202, RMS 204, process manager 218 and processing station 206, the components and functionality of RSMS 224 may be included in any of these other processes, or divided among the processes as appropriate.

HARDWARE OVERVIEW

Figure 7:
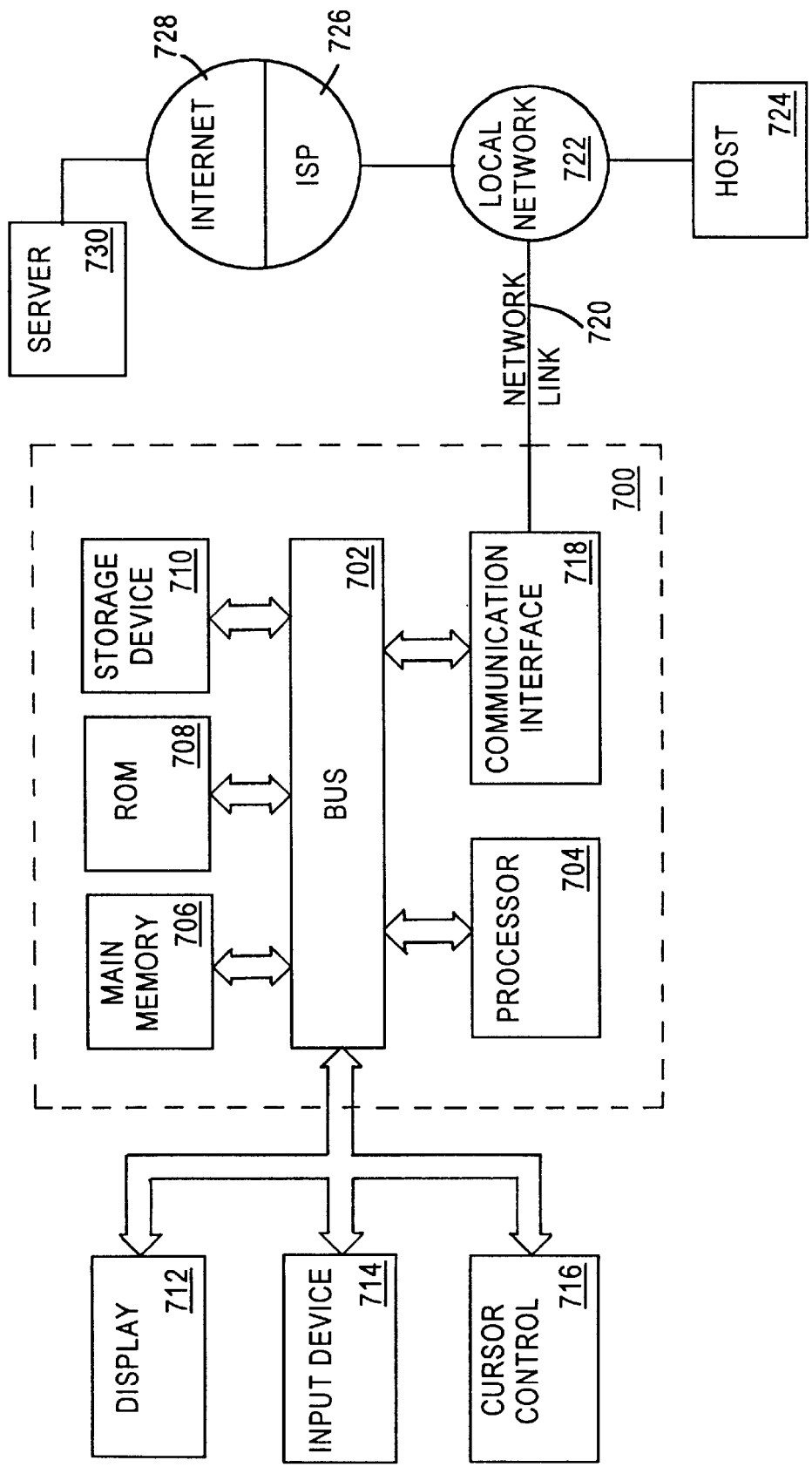
FIG. 7 is a block diagram of a computer system on which embodiments of the invention may be implemented.

FIG. 7 is a block diagram that illustrates a computer system 700 upon which RSMS 224 as described herein may be implemented. RSMS 224 may be implemented as a software process executing on a generic computer system may be implemented in discrete hardware circuitry, or in any combination of hardware circuitry and software processes. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing a manufacturing process. According to one embodiment of the invention, the management of a manufacturing process is provided by computer system 700 in response to processor 704 executing sequences of instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software. In addition, multiprocessor systems may be employed in place of processor 704.

The term "computer-readable medium" as used herein refers to any medium that participates in providing instructions to processor 704 for execution. Such a medium may take many forms, including but not limited to non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying sequences of instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the management of a manufacturing process as described herein.

The received code may be executed by processor 704 as it is received, and/or stored in storage device 710, or other non-volatile storage for later execution. In this manner, computer system 700 may obtain application code in the form of a carrier wave.

The invention provides several advantages over prior approaches. Significantly, when a user causes a recipe and/or context that is referenced in an "approved" specification to be downloaded to a processing station, the user is assured that the contents of the downloaded recipe and/or context are the same as when the specification was frozen and subsequently approved. Embodiments of the invention as described herein prevent subsequent modifications of a recipe and/or context from interfering with an approved specification.

Also, the approach for generating projects as described herein guarantees that multiple references to a recipe and/or context in more than one specification in a project all reference the same version number of the recipe and/or context. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for validating process data, the method comprising the steps of:

first determining whether a reference in the process data to a first set of process instructions satisfies a set of syntax criteria;

second determining whether the reference to the first set of process instructions specifies a valid version of the set of process instructions;

third determining whether a reference in the process data to a set of process identification data satisfies the set of syntax criteria;

fourth determining whether the reference in the process data to the set of process identification data specifies a valid version of the set of process identification data; and validating the process data based on the first, second, third, and fourth determining steps.

2. The method of claim 1, wherein the second determining step includes the steps of if the reference to the first set of process instructions specifies an existing set of process instructions, determining whether the reference to the first set of process instructions specifies a most current version of the set of process instructions, and if the reference to the first set of process instructions specifies a new set of process instructions, determining whether the reference to the first set of process instructions specifies a next available version of the set of process instructions.

3. The method of claim 2, wherein the third determining step includes the steps of if the reference to the set of process identification data specifies an existing set of process identification data, determining whether the reference to the set of process identification data specifies the most current version of the set of process identification data, and if the reference to the set of process identification data specifies a new set of process identification data, determining whether the reference to the set of process identification data specifies the next available version of the set of process identification data.

4. The method of claim 1, wherein:

the method further comprises fifth determining whether a reference in the first set of process instructions to a second set of process instructions satisfies the set of syntax criteria, and the validating step includes validating the process data based on the fifth determining step.

5. The method of claim 1, wherein the step of validating the process data includes the steps of reserving a version identification associated with process data, and providing a validation signal to indicate that the process data has been validated.

6. The method of claim 1, further comprising the step of in response to receiving and reviewing an approval of the process data designating the version of the set of process instructions as the valid version for the first set of process instructions, and designating the version of the set of process identification data as the valid version for the set of process identification data.

7. The method of claim 1, further including in response to receiving a request to identify one or more sets of process instructions associated with the process data, performing the steps of examining the process data to identify the reference in the process data to the first set of process instructions, and providing the reference in the process data that references the first set of process instructions.

8. The method of claim 1, further including in response to receiving a request to identify one or more sets of process data that reference the first set of process instructions performing the steps of examining the one or more sets of process data to determine if any of the one or more sets of process data reference the set of process instructions, and if any of the one or more sets of process data references the set of process instructions, then providing the identity of any of the one or more sets of process data that reference the set of process instructions.

9. The method of claim 1, further including in response to a request to approve a project that includes two or more sets of process data, performing the steps of determining whether first and second references in the two or more sets of process data to the set of process steps specify the same version of the set of process steps, and if the first and second references to the set of process steps do not specify the same version of the set of process steps, then signaling that the two or more sets of process data do not specify the same version of the set of process steps.

10. A computer-readable medium carrying one or more sequences of one or more instructions for validating process data, wherein the execution of the one or more sequences of one or more instructions by one or more processors causes the one or more processors to perform the steps of:

first determining whether a reference in the process data to a first set of process instructions satisfies a set of syntax criteria;

second determining whether the reference to the first set of process instructions specifies a valid version of the set of process instructions;

third determining whether a reference in the process data to a set of process identification data satisfies the set of syntax criteria;

fourth determining whether the reference in the process data to the set of process identification data specifies a valid version of the set of process identification data; and validating the process data based on the first, second, third, and fourth determining steps.

11. The computer-readable medium of claim 10, wherein the second determining step includes the steps of if the reference to the set of process instructions specifies an existing set of process instructions, determining whether the reference to the set of process instructions specifies a most current version of the set of process instructions, and if the reference to the set of process instructions specifies a new set of process instructions, determining whether the reference to the set of process instructions specifies the next available version of the set of process instructions.

12. The computer-readable medium of claim 11, wherein the third determining step includes the steps of if the reference to the set of process identification data specifies an existing set of process identification data, determining whether the reference to the set of process identification data specifies the most current version of the set of process identification data, and if the reference to the set of process identification data specifies a new set of process identification data, determining whether the reference to the set of process identification data specifies the next available version of the set of process identification data.

13. The computer-readable medium of claim 10, wherein:

the method further includes the step of fifth determining whether a reference in the first set of process instructions to a second set of process instructions satisfies the set of syntax criteria, and the validating step includes validating the process data based upon the fifth determining step.

14. The computer-readable medium of claim 10, wherein the step of validating the process data includes the steps of reserving a version identification associated with process data, and providing a validation signal to indicate that the process data has been validated.

15. The computer-readable medium of claim 10, further comprising in response to receiving an approval of the process data, performing the steps of designating the version of the first set of process instructions as the valid version for the set of process instructions, and designating the version of the set of process identification data as the valid version for the set of process identification data.

16. The computer-readable medium of claim 10, further including in response to a request to identify one or more sets of process instructions associated with the process data, performing the steps of examining the process data to identify the reference in the process data to the first set of process instructions, and providing the reference in the process data that references the first set of process instructions.

17. The computer-readable medium of claim 10, further including in response to a request to identify one or more sets of process data that reference the first set of process instructions, performing the steps of examining the one or more sets of process data to determine if any of the one or more sets of process data reference the set of process instructions, and if any of the one or more sets of process data references the set of process instructions, then providing the identity of any of the one or more sets of process data that reference the set of process instructions.

18. The computer-readable medium of claim 10, further including in response to a request to approve a project that includes two or more sets of process data, performing the steps of determining whether first and second references in the two or more sets of process data to the set of process steps specify the same version of the recipe, and if the first and second references to the set of process steps do not specify the same version of the set of process steps, then signaling that the two or more sets of process data do not specify the same version of the set of process steps.

19. A computer system configured to validate and release process data, the computer system comprising:

a) a validation process configured for validating the process data by performing the steps of i) determining whether a reference in the process data to a set of process instructions satisfies a set of syntax criteria, ii) determining whether the reference to the set of process instructions specifies a valid version of the set of process instructions; and b) a release process configured for approving the process data by performing the step of designating the version of the set of process instructions as the valid version for the set of process instructions.

20. The computer system of claim 19, further comprising a browser process configured to provide reference information in the process data to the set of process instructions by examining the process data to identify one or more references to the set of process instructions, and providing the one or more references to the set of process instructions.

21. The computer system of claim 19, further comprising a project editor process configured to generate a project that includes one or more sets of process data by performing the steps of generating an association between the one or more sets of process data to be included in the project, determining whether first and second references in the one or more sets of process data to the set of process steps specify the same version of the set of process steps, and if the first and second references to the set of process steps do not specify the same version of the set of process steps, then signaling that the two or more sets of process data do not specify the same version of the set of process steps.

22. A method for verifying a semiconductor process specification used in the fabrication of a semiconductor device, the method comprising the steps of:

determining whether a reference in the specification to a recipe that specifies a sequence of process instructions satisfies a set of syntax criteria;

determining whether the reference in the specification to the recipe specifies a valid version of the recipe;

determining whether a reference in the specification to a context that specifies semiconductor process identification data satisfies the set of syntax criteria;

determining whether the reference in the specification to the context specifies a valid version of the context; and validating the specification based upon one or more of the determining steps.

23. The method of claim 22, wherein the step of determining whether the reference in the specification to the recipe specifies a valid version of the recipe includes the steps of if the reference specifies an existing version of the recipe, determining whether the reference specifies the most recent version of the recipe, and if the reference specifies a new version of the recipe, determining whether the reference specifies the next available version of the recipe.

24. The method of claim 22, wherein the step of determining whether the reference in the specification to the context specifies a valid version of the context includes the steps of if the reference specifies an existing version of the context, determining whether the reference specifies the most recent version of the context, and if the reference specifies a new version of the context, determining whether the reference specifies the next available version of the context.

25. The method of claim 22, wherein the step of validating the specification based upon the determining steps includes the steps of reserving a version identification associated with the specification, and providing a validation signal to indicate that the specification has been validated.

26. A semiconductor process management system comprising:

a) a recipe management system (RMS) that contains one or more recipes and one or more contexts, wherein each recipe specifies a sequence of process instructions and wherein each context specifies process identification data;

b) a processing station for performing a processing step on a semiconductor device in response to processing one or more recipes and one or more contexts;

c) a processing manager that contains one or more specifications, wherein each specification contains references to one or more recipes and one or more contexts; and d) a recipe and specification management system (RSMS) for verifying one or more specifications used during the fabrication of the semiconductor device.

27. The semiconductor process management system of claim 26 further comprising a client for generating and editing one or more specifications and submitting one or more specifications to the process manager.

28. The semiconductor process management system of claim 27, wherein the client includes a specification browser for identifying cross-reference information between specification, recipes and contexts.

29. The semiconductor process management system of claim 27, wherein the client includes a project editor for logically associating one or more specifications with a project.

* * * * *